US010567020B2

United States Patent
Grzeskowiak et al.

(10) Patent No.: US 10,567,020 B2
(45) Date of Patent: Feb. 18, 2020

(54) DEVICE FOR PROCESSING AN AUDIO SIGNAL ARISING FROM A RADIOFREQUENCY SIGNAL

(71) Applicants: Continental Automotive France, Toulouse (FR); Continental Automotive GmbH, Hannover (DE)

(72) Inventors: Jean-Christophe Grzeskowiak, Bû (FR); Laurent Thery, Les Essarts le Roi (FR)

(73) Assignees: Continental Automotive France, Toulouse (FR); Continental Automotive GmbH, Hannover (DE)

( * ) Notice: Subject to any disclaimer, the term of this patent is extended or adjusted under 35 U.S.C. 154(b) by 0 days.

(21) Appl. No.: 16/332,010

(22) PCT Filed: Sep. 12, 2017

(86) PCT No.: PCT/FR2017/052411
§ 371 (c)(1),
(2) Date: Mar. 11, 2019

(87) PCT Pub. No.: WO2018/051000
PCT Pub. Date: Mar. 22, 2018

(65) Prior Publication Data
US 2019/0215024 A1  Jul. 11, 2019

(30) Foreign Application Priority Data

Sep. 15, 2016  (FR) ...................................... 16 58647

(51) Int. Cl.
*H04B 1/10* (2006.01)
(52) U.S. Cl.
CPC ................................ *H04B 1/1081* (2013.01)

(58) Field of Classification Search
CPC .......... H04B 1/04; H04B 1/10; H04B 1/1027; H04B 1/1081; H03G 3/00; H03G 5/00; H04R 3/04; H04R 29/00; G10L 25/21
See application file for complete search history.

(56) References Cited

U.S. PATENT DOCUMENTS

| 9,768,853 B1* | 9/2017 | Kroeger | ............... H04B 1/1027 |
| 2003/0022650 A1* | 1/2003 | Tsuji | .................... H04B 1/1081 |
| | | | 455/296 |

(Continued)

FOREIGN PATENT DOCUMENTS

| EP | 0253902 A1 | 1/1988 |
| EP | 1100208 A1 | 5/2001 |
| FR | 3032073 A1 | 7/2016 |

OTHER PUBLICATIONS

International Search Report and Written Opinion for International Application No. PCT/FR2017/052411, dated Dec. 11, 2017—8 pages.

(Continued)

*Primary Examiner* — Thanh C Le
(74) *Attorney, Agent, or Firm* — RatnerPrestia

(57) ABSTRACT

A device for processing an audio signal arising from a radiofrequency signal, including: an instantaneous multipath sensor able to analyze the radiofrequency signal so as to determine an instantaneous multipath rate, an instantaneous filter block able to attenuate the audio signal in line with an instantaneous attenuation that is an increasing function of the instantaneous multipath rate, also including a mean multipath sensor able to determine a mean multipath rate, and a mean filter block able to attenuate the audio signal in line with a mean attenuation that is an increasing function of the mean multipath rate. A radio receiver having such a processing device is also disclosed.

8 Claims, 2 Drawing Sheets

(56) References Cited

U.S. PATENT DOCUMENTS

| | | | |
|---|---|---|---|
| 2004/0221209 A1* | 11/2004 | Kupferschmidt | G10L 19/005 714/713 |
| 2010/0195771 A1* | 8/2010 | Takahashi | H04L 27/14 375/324 |
| 2011/0044414 A1* | 2/2011 | Li | H04B 1/1081 375/350 |
| 2017/0374461 A1 | 12/2017 | Potereau et al. | |

OTHER PUBLICATIONS

English Translation of the Written Opinion for International Application No. PCT/FR2017/052411, dated Dec. 11, 2017—7 pages.

* cited by examiner

DEVICE FOR PROCESSING AN AUDIO SIGNAL ARISING FROM A RADIOFREQUENCY SIGNAL

CROSS REFERENCE TO RELATED APPLICATIONS

This application is the U.S. National Phase Application of PCT International Application No. PCT/FR2017/052411, filed Sep. 12, 2017, which claims priority to French Patent Application No. 1658647, filed Sep. 15, 2016, the contents of such applications being incorporated by reference herein.

FIELD OF THE INVENTION

The present invention relates to a device for processing an audio signal arising from a radiofrequency signal. The present invention aims more particularly to reduce the drawbacks of multipaths.

BACKGROUND OF THE INVENTION

In the field of transmitting an audio signal by way of a radiofrequency signal, it is known to carry out processing operations on the audio signal upon reception on the basis of observable characteristics of the radiofrequency signal.

Multipath is a phenomenon that occurs during a radiofrequency transmission. The radiofrequency signal undergoes multiple reflections, creating copies of said radiofrequency signal that are generally attenuated and phase-offset. All of these signals are superimposed at a receiver and interfere with the transmission. The more crowded the environment in which the signal is transmitted, for example in an urban environment or else when elevations are present, the higher the number of multiple reflections and/or multipaths and, with this, the greater the interference caused to the radiofrequency signal and therefore to the audio signal arising from the radiofrequency signal.

It is thus known to estimate a multipath magnitude by way of a multipath sensor observing the radiofrequency signal and determining an amount indicative of the number of multipaths, and to attenuate the audio signal on the basis of said multipath magnitude.

However, such a processing operation, which is performed instantaneously, does not take into account the history, the repetition and/or the density of the multipaths. In the event of significant repetition of the multipaths, the instantaneous processing operation may lead to pumping effects, which may create harmful instabilities on the audio signal.

SUMMARY OF THE INVENTION

One aspect of the invention is a device for processing an audio signal arising from a radiofrequency signal, comprising: an instantaneous multipath sensor able to analyze the radiofrequency signal so as to determine an instantaneous multipath rate, an instantaneous filter block able to attenuate the audio signal in line with an instantaneous attenuation that is an increasing function of the instantaneous multipath rate, also comprising a mean multipath sensor able to determine a mean multipath rate, a mean filter block able to attenuate the audio signal in line with a mean attenuation that is an increasing function of the mean multipath rate.

According to another feature, the mean multipath sensor determines a mean multipath rate by analyzing the radiofrequency signal with a time constant larger than that of the instantaneous multipath sensor.

According to one alternative feature, the mean multipath sensor determines a mean multipath rate by analyzing the instantaneous multipath rate, preferably by way of temporal filtering.

According to another feature, the instantaneous attenuation is between a minimum instantaneous attenuation and a maximum instantaneous attenuation that are able to be configured, the mean attenuation is between a minimum mean attenuation and a maximum mean attenuation that are able to be configured, which may be respectively different from the minimum and maximum instantaneous attenuations.

According to another feature, the instantaneous filter block is also able to perform a gradual transition over time, upon an activation and/or a deactivation, and the mean filter block is also able to perform a gradual transition over time, upon an activation and/or a deactivation.

According to another feature, the gradual transition of the instantaneous filter block is determined by an instantaneous attack time and by an instantaneous release time, the gradual transition of the mean filter block is determined by a mean attack time, which may be different from the instantaneous attack time, and by a mean release time, which may be different from the instantaneous release time.

An aspect of the invention also relates to a radio receiver comprising such a processing device.

BRIEF DESCRIPTION OF THE DRAWINGS

Other features, details and advantages of aspects of the invention will become more clearly apparent from the detailed description provided below by way of indication with reference to the drawings, in which.

DETAILED DESCRIPTION OF THE PREFERRED EMBODIMENTS

Figure 1:
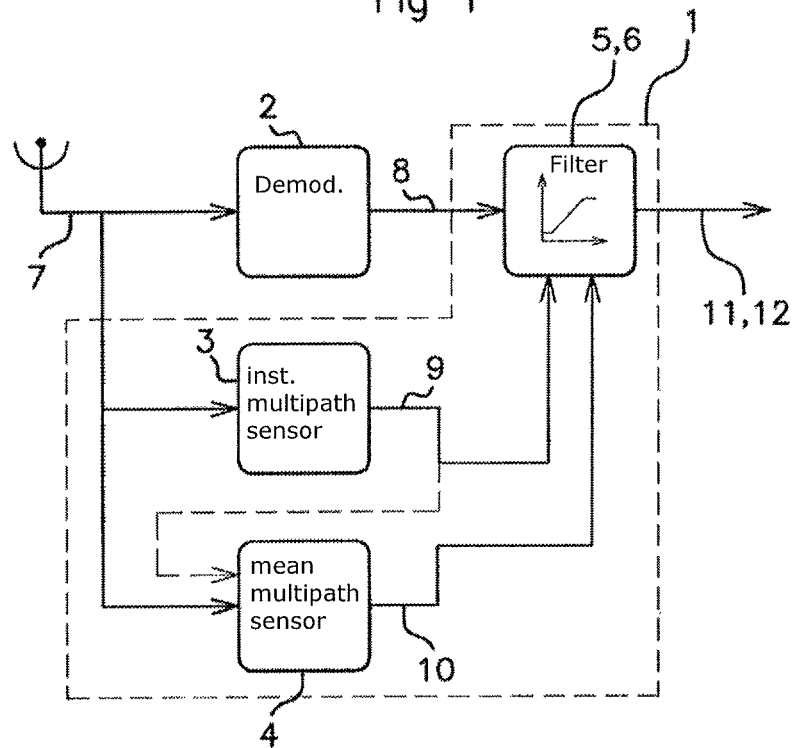
FIG. 1 illustrates a device for processing an audio signal,
FIG. 2 describes one mode of operation of a filter block.

As illustrated in FIG. 1, a processing device 1 is applied to the processing of an audio signal 8. This audio signal 8 arises from a radiofrequency signal 7. An aspect of the invention thus advantageously takes place in a radio receiver, such as a car radio. Such a radio receiver comprises a demodulator 2 able to transform the radiofrequency signal 7 into an audio signal 8.

The device 1 comprises, as is known, an instantaneous filter block 5 and an instantaneous multipath sensor 3. The instantaneous filter block 5 attenuates the audio signal 8 on the basis of the presence of multipaths, this being measured by an instantaneous multipath rate 9 determined by the instantaneous multipath sensor 3, typically by analyzing the radiofrequency signal 7.

In the presence of multipaths, the radiofrequency signal 7 contains more high frequencies. An instantaneous multipath sensor 3 may thus for example be formed by way of a bandpass filter, such as for example a 2nd-order IIR filter, having a center frequency of 18 kHz, with a bandwidth at 3 dB of around 4 kHz. The instantaneous multipath rate 9 that is obtained is an analog signal that may be calibrated between 0%, absence of multipath, and 100%, maximum multipath level.

The instantaneous filter block 5 applies an instantaneous attenuation AI to the audio signal 8. The higher the instantaneous multipath rate 9, the more the audio signal 8 is attenuated.

Figure 2:
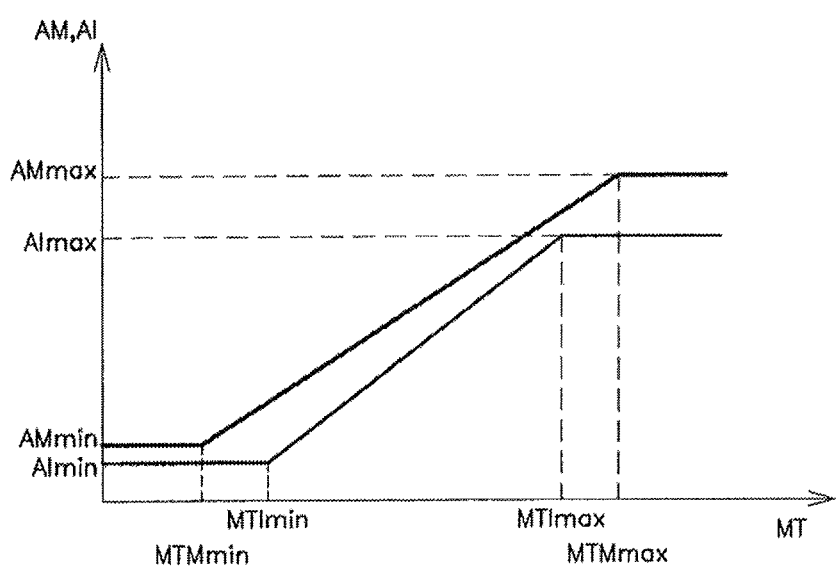

The instantaneous attenuation AI is defined by a function of the instantaneous multipath rate 9, MTI. According to one embodiment illustrated in FIG. 2, this function may be defined by a minimum value AImin, typically zero, and a maximum value AImax of the instantaneous attenuation AI, and a minimum threshold MTImin and a maximum threshold MTImax of the instantaneous multipath rate 9, MTI, as follows. The instantaneous attenuation AI is: equal to the minimum value AImin when the instantaneous multipath rate 9, MTI is lower than the minimum threshold MTImin, equal to the maximum value AImax when the instantaneous multipath rate 9, MTI is greater than the maximum threshold MTImax, and equal to an intermediate value, for example defined by a linear segment between these two values.

This instantaneous processing, which is instantaneous in that it reacts quickly to the occurrence of multipaths, is suitable for the quick processing of a multipath, particularly in the case of an isolated multipath. The instantaneous processing, known from the prior art, is thus retained.

However, in the event of repetition of the multipaths, the instantaneous processing may lead to instability of the audio signal 8.

Therefore, according to one important feature of an aspect of the invention, a mean filter block 6 and a mean multipath sensor 4 are added to the device 1. Like the instantaneous filter block 5, the mean filter block 6 attenuates the audio signal 8 on the basis of the presence of multipaths, this being measured by a mean multipath rate 10 determined by the mean multipath sensor 4. The two instantaneous 5 and mean 6 filter blocks may, as shown in FIG. 1, be combined into one and the same component.

The aim of the mean multipath sensor 4 is to determine an image of the multipaths, averaged over time, over a longer time period than the instantaneous multipath sensor 3.

Applying such a mean attenuation AM, in line with a mode of application similar to the instantaneous attenuation AI but based on a mean multipath rate 10, advantageously enables, in the event of repeated multipaths, more long-term processing, making it possible to smooth the attenuation over a longer time without the risk of a pumping effect.

This avoids the risk of instability in the processing of the signal.

In addition, the two instantaneous and mean processing operations advantageously complement one another in that the instantaneous processing benefits from an improved attenuation level due to the mean processing. Therefore, the mean processing, due to the mean attenuation that it provides, adds stability to the device 1.

At least two embodiments of the mean multipath sensor 4 are possible.

According to a first embodiment, like the instantaneous multipath sensor 3, the mean multipath sensor 4 determines the mean multipath rate 10 by analyzing the radiofrequency signal 7. This is shown by an unbroken line in FIG. 1. In this embodiment, the principle of the mean multipath sensor 4 is substantially comparable to that of the instantaneous multipath sensor 3, but with a larger time constant. Thus, illustratively, the time constant at the output of the instantaneous multipath sensor 3 is fast, of the order of a millisecond, typically 2 ms, whereas the time constant at the output of the mean multipath sensor 4 is slow, of the order of a second, typically 3 s.

According to a second embodiment, the mean multipath rate 10 is determined from the instantaneous multipath rate 9. This is shown by a dashed line in FIG. 1. This is preferably performed by way of temporal filtering.

Regardless of the embodiment, the mean multipath rate 10 that is obtained is an analog signal that may be calibrated between 0%, absence of multipath, and 100%, maximum multipath level.

The mean filter block 6 applies a mean attenuation AM to the audio signal 8. The higher the mean multipath rate 10, the more the audio signal 8 is attenuated.

The mean attenuation AM is defined by a function of the mean multipath rate 10, MTM. According to one embodiment illustrated in FIG. 2, this function may be defined by a minimum value AMmin, typically zero, and a maximum value AMmax of the mean attenuation, and a minimum threshold MTMmin and a maximum threshold MTMmax of the mean multipath rate 10, MTM, as follows. The mean attenuation AM is: equal to the minimum value AMmin when the mean multipath rate 10, MTM is lower than the minimum threshold MTMmin, equal to the maximum value AMmax when the mean multipath rate 10, MTM is greater than the maximum threshold MTMmax, and equal to an intermediate value, for example defined by a linear segment between these two values.

According to one feature, the minimum mean attenuation AMmin and the maximum mean attenuation AMmax are able to be configured, and may be respectively different from the minimum instantaneous attenuation AImin and from the maximum instantaneous attenuation AImax.

Likewise, the minimum mean multipath threshold MTMmin and the maximum mean multipath threshold MTMmax are able to be configured, and may be respectively different from the minimum instantaneous multipath threshold MTImin and from the maximum instantaneous multipath threshold MTImax.

According to one embodiment, the minimum mean multipath threshold MTMmin, respectively the maximum mean multipath threshold MTMmax, is preferably taken to be lower than the minimum instantaneous multipath threshold MTImin, respectively higher than the maximum instantaneous multipath threshold MTImax, so that the repeated multipaths are processed quickly. Likewise, the minimum mean attenuation AMmin, respectively the maximum mean attenuation AMmax, is preferably taken to be equal to the minimum instantaneous attenuation AImin, respectively to the maximum instantaneous attenuation AImax. It should be noted that, even when they are equal, the minimum instantaneous attenuation AImin, respectively maximum instantaneous attenuation AImax, is not reached at the same time as the minimum mean attenuation AMmin, respectively maximum mean attenuation AMmax, due to the different minimum multipath thresholds MTImin, MTMmin, respectively maximum multipath thresholds MTImax, MTMmax.

According to another feature, the instantaneous filter block 5 is also able to perform a gradual transition over time, upon an activation and/or a deactivation. Likewise, the mean filter block 6 is also able to perform a gradual transition over time, upon an activation and/or a deactivation.

This gradual transition of the filter block is typically determined by an attack time TA and by a release time TR.

The instantaneous processing is thus characterized by an instantaneous attack time TAI and by an instantaneous release time TRI. Likewise, the mean processing is determined by a mean attack time TAM, which may advantageously be different from the instantaneous attack time TAI, and by a mean release time TRM, which may advantageously be different from the instantaneous release time TRI.

Figure 3:
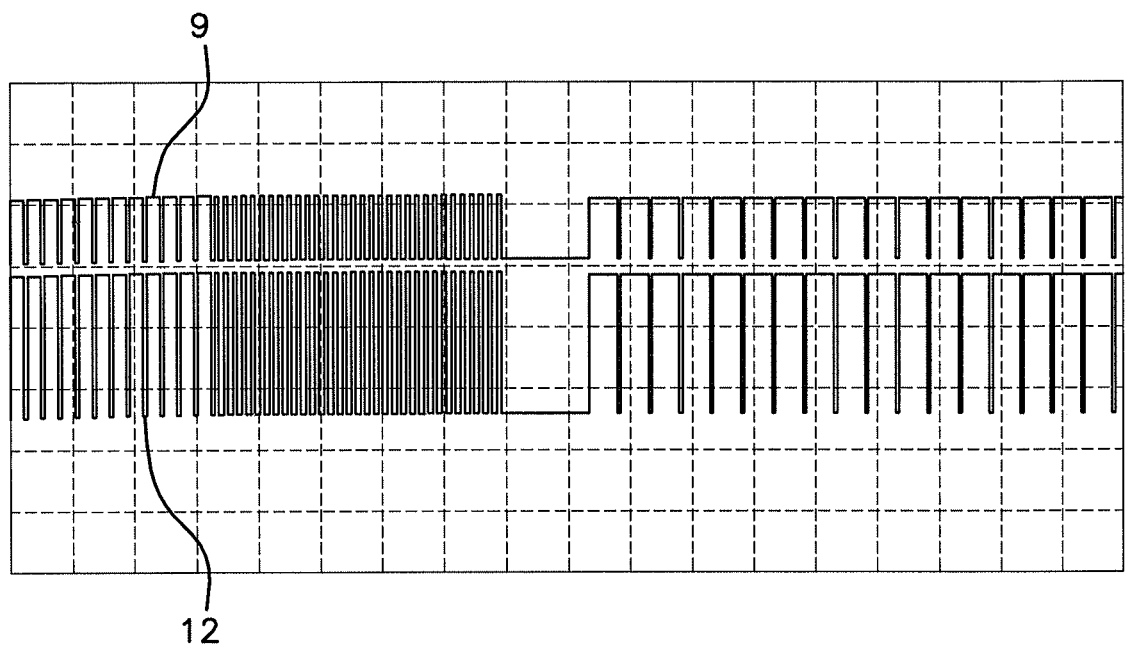
FIG. 3 illustrates a comparative timing diagram, with an upper curve showing the instantaneous multipath rate and a lower curve showing the audio signal arising from the device, according to the prior art, with only instantaneous processing.
Figure 4:
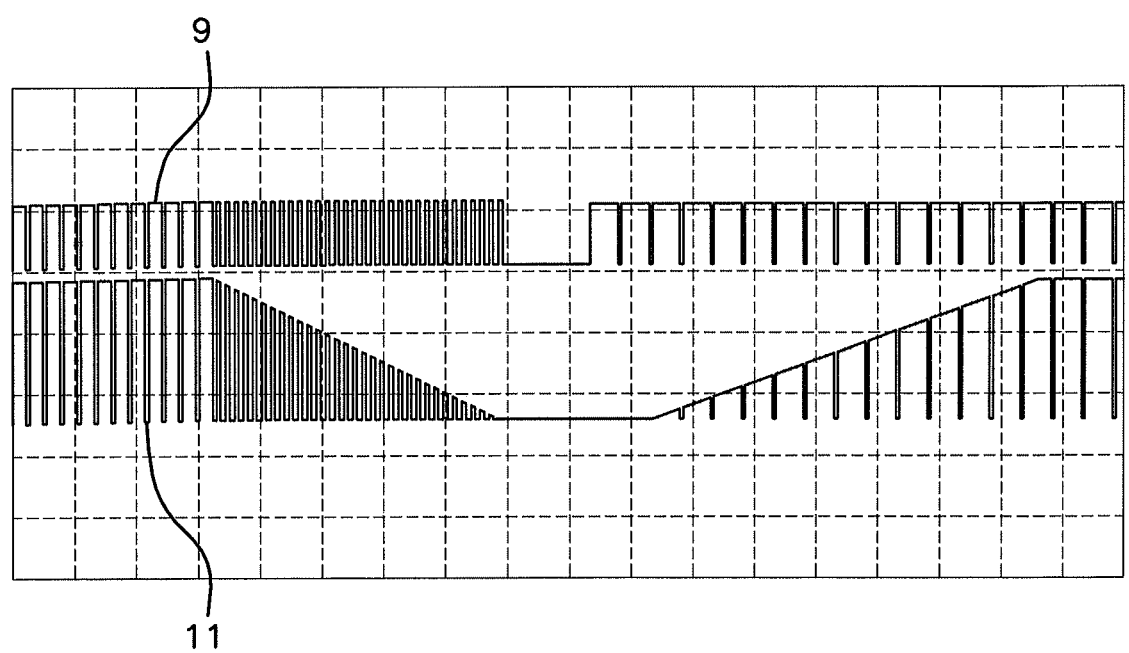
FIG. 4 illustrates a comparative timing diagram, with an upper curve showing the instantaneous multipath rate and a lower curve showing the audio signal arising from the device, according to an aspect of the invention, with instantaneous processing and mean processing.

FIGS. 3 and 4 illustrate the contribution of an aspect of the invention. The two FIGS. 3 and 4 show, on a comparative timing diagram, an upper curve indicative of the instantaneous multipath rate 9 and a lower curve illustrating the result of the processing, that is to say the audio signal 11, 12 at output.

FIG. 3 illustrates the prior art with only instantaneous processing, and an output audio signal 12 according to the prior art, whereas FIG. 4 illustrates an aspect of the invention with instantaneous processing combined with mean processing, and an output audio signal 11 according to an aspect of the invention.

A cumulative effect on the attenuation of the audio signal 11 due to the repetition of the multipaths is clearly visible.

An aspect of the invention also relates to a radio receiver comprising such a processing device 1.

The invention claimed is:

1. A device for processing an audio signal arising from a radiofrequency signal, comprising:
   an instantaneous multipath sensor able to analyze the radiofrequency signal so as to determine an instantaneous multipath rate,
   an instantaneous filter block able to attenuate the audio signal in line with an instantaneous attenuation that is an increasing function of the instantaneous multipath rate,
   a mean multipath sensor able to determine a mean multipath rate, and
   a mean filter block able to attenuate the audio signal in line with a mean attenuation that is an increasing function of the mean multipath rate.

2. The device as claimed in claim 1, wherein the mean multipath sensor determines a mean multipath rate by analyzing the radiofrequency signal with a time constant larger than that of the instantaneous multipath sensor.

3. The device as claimed in claim 1, wherein the mean multipath sensor determines a mean multipath rate by analyzing the instantaneous multipath rate.

4. The device as claimed in claim 1, wherein the instantaneous attenuation is between a minimum instantaneous attenuation and a maximum instantaneous attenuation that are able to be configured, wherein the mean attenuation is between a minimum mean attenuation and a maximum mean attenuation that are able to be configured, which may be respectively different from the minimum and maximum instantaneous attenuations.

5. The device as claimed in claim 1, wherein the instantaneous filter block is also able to perform a gradual transition over time, upon an activation and/or a deactivation, and the mean filter block is also able to perform a gradual transition over time, upon an activation and/or a deactivation.

6. The device as claimed in claim 5, wherein the gradual transition of the instantaneous filter block is determined by an instantaneous attack time and by an instantaneous release time, wherein the gradual transition of the mean filter block is determined by a mean attack time, which may be different from the instantaneous attack time, and by a mean release time, which may be different from the instantaneous release time.

7. A radio receiver comprising a device for processing an audio signal as claimed in claim 1.

8. The device as claimed in claim 1, wherein the mean multipath sensor determines a mean multipath rate by analyzing the instantaneous multipath rate by temporal filtering.

* * * * *